Figure 2:
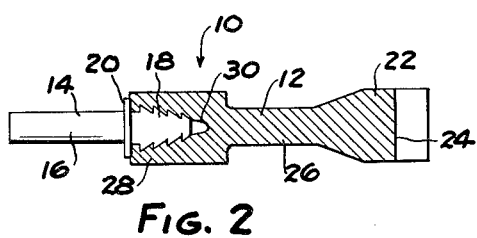

Aug. 7, 1962 D. W. KNOWLES 3,047,936
GAS TURBINE ROTOR
Filed March 11, 1959

INVENTOR.
DOUGLAS W. KNOWLES
BY
Clifford L. Sadler
ATTORNEY

United States Patent Office 3,047,936
Patented Aug. 7, 1962

3,047,936
GAS TURBINE ROTOR
Douglas W. Knowles, Grosse Pointe Park, Mich., assignor to Curtiss-Wright Corporation, Utica, Mich., a corporation of Delaware
Filed Mar. 11, 1959, Ser. No. 798,729
1 Claim. (Cl. 29—156.8)

The present invention relates to a simplified method of manufacturing bladed rotors such as are used in turbines, compressors, and the like. More specifically, this invention teaches a method for attaching preformed blades to the rotor disc.

Rotors for gas turbine engines operate at extremely high speeds and at high temperatures ranging to 1500° F. or above. Under such conditions the centrifugal forces are great, and prior to the present invention the problem of anchoring the formed blade to the rotor disc has been a serious one. The presently accepted method for attaching the blades to the wheel disc is to provide a dovetail or "fir tree" shaped root section on the blade which is fitted into a complementary slot in the rotor disc. Extremes in operating conditions make it necessary that the root of the blade and the groove in the disc be machined with precision. Because of this exactness with which the dovetail connection must be made and because of the difficulties in machining the alloys which must be used for such rotors and blades in order to give them the needed strength to withstand the stresses and temperatures involved, it is obvious that such bladed rotors are tedious and expensive to manufacture.

Further, such prior art methods are adaptable principally to blade roots which slip into a slot formed axially in the rim of the rotor disc. It has been long recognized by those skilled in the art that a continuous annular slot formed about the rim of the disc so that the blades may be positioned in the slot with their root portions circumferentially aligned is the preferred form of blade attachment. That this permits a rotor construction of increased strength can be appreciated when it is observed that with axial slots each blade root is in fact being held between radial projections from the rotor disc, whereas with a circumferential slot the blade roots are held between portions of the rim which are circumferentially continuous.

In spite of the recognized structural advantages to the circumferential type of attachment as distinguished from the axial attachment, this preferred form has not been widely used up to now because of the extreme problems in manufacturing such a rotor blank and positioning the blades about the rotor.

Therefore, in view of the foregoing described state of the art, it is an object of the present invention to provide a method for attaching rooted aerodynamic blades to a rotor disc having an annular slot formed in its rim.

It is a further object of the present invention to teach such a method of manufacture in which precision and difficult machining of blade roots and rotor disc slots is eliminated.

Figure 1:
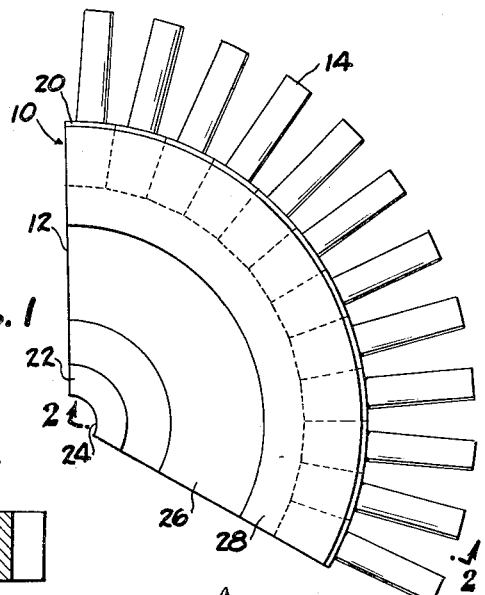
Figure 3:
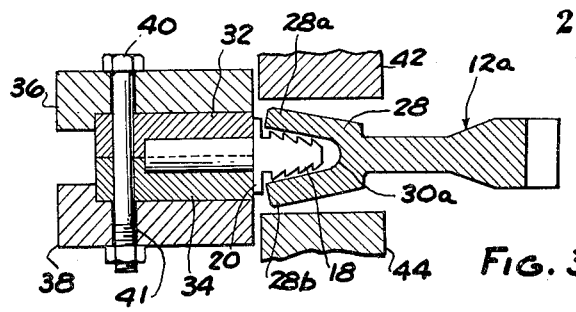
Figure 6:
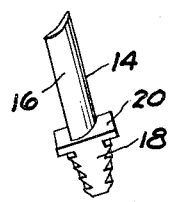
Figure 5:
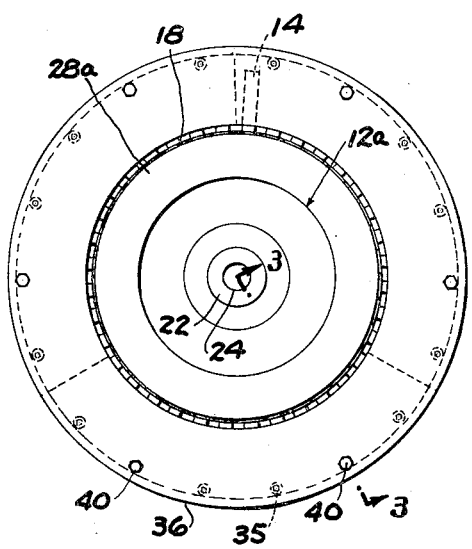
Figure 4:
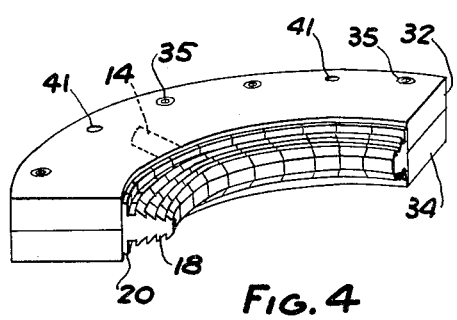

It is still another object of this invention to provide a method for manufacturing bladed rotors which is characterized by its simplicity and economy. These and further objects of the present invention will become apparent from the following detailed description and the accompanying drawings in which:

FIGURE 1 is a plan view disclosing a portion of a turbine wheel with aerodynamic blades attached thereto, FIGURE 2 is a sectional view taken along section lines 2—2 of FIG. 1, FIGURE 3 is an elevational view in section taken along section lines 3—3 of FIG. 5 disclosing a step in the fabrication of the rotor wheel, FIGURE 4 discloses the rotor blades being held in a fixture clamp prior to assembly to the rotor disc, and FIGURE 5 is a plan view of the rotor blades and disc.

Referring now to the drawings wherein like reference numerals define like parts, FIGURE 1 discloses a turbine wheel 10 having a rotor disc portion 12 and a series of individual aerodynamic turbine blades 14 attached thereto. The blades 14 have an aerodynamic portion 16 and a root portion 18. In the drawing the blades 14 are shown as having an irregular root shape known in the art as a "fir tree"; however, the present invention comprehends alternate root shapes such as the dovetail, the keyhole, and the like. The blades 14 also have a platform portion 20 which divides the aerodynamic end 16 from the root end 18.

As shown by FIGURES 1 and 4, the root sections 18 have radially disposed side faces which, when engaged with the root sections of next adjacent bladed members, form an arcurate segment with the irregular or locking root shapes in contiguous and annularly disposed alignment.

The rotor disc is of one-piece construction and has a hub portion 22 and an axial bore 24 therein to receive the shaft to which the completed turbine wheel is attached. The rotor disc 12 also has a reduced midportion 26 and an enlarged rim 28 in which the blade roots are received. From FIG. 2 it is seen that the serrations of the root 18 are circumferentially aligned and are received within an annular slot 30 formed about the outer edge of the rim 28.

To affix the blades 14 to the rotor disc 12, the blades 14 are first positioned in a fixture having upper and lower clamp parts 32 and 34. The clamp parts 32 and 34 have the general form of segments of a circle and, as shown in the drawing, hold those blades 14 found in 120 degrees of the periphery of the wheel 10. The arcuate clamp parts 32 and 34 have a series of radial slots formed on their mating surfaces between which the blades 14 are received and positioned. A series of countersunk bolts 35 holds the blades 18 between the clamp parts 32 and 34.

FIGURE 4 discloses the clamps 32 and 34 with the blades contained therein and with the blade roots 18 extending radially inwardly therefrom. As this fixture covers 120 degrees of the rotor wheel, three are needed to contain all of the blades which are to be formed to the finished wheel.

As shown in FIG. 3, the rotor disc is preformed as generally indicated by reference numeral 12a so that its outer rim 28a has an annular slot 30a formed therein. The slot 30a is defined by diverging circumferential rim portions 28a and 28b. The divergence of portions 28a and 28b is sufficient so that slot 30a is large enough to contain the irregular root shape 18 of the blade 14.

The preformed rotor 12a is positioned on an hydraulic press, and the series of clamps 32 and 34 with the blades contained therein is located about its periphery so that the root portions 18 fit within the slot 30a and between the rim portion 28a and 28b. Three segments of the blade holding fixtures 32 and 34 are positioned together so that the blades 14 are arranged circumferentially about the rim of the disc 12a. These segmental clamps 32 and 34 are then secured relative to one another between continuous rings 36 and 38. The entire blade and blade holding assembly comprising the blades 14, three sets of clamps 32 and 34, and the pair of rings 36 and 38 are then secured together by means such as bolts 40 which pass through bolt holes 41.

The assembled blades 14 are thus properly positioned relative to the preformed rotor disc 12a. In accordance with the present invention, a matched pair of die members 42 and 44 are brought together with great force so that rim portions 28a and 28b are permanently closed about the blade roots 18. This closing of the rim about the blade roots 18 is done in accordance with forging or cold working techniques well known in the art. When the die members 42 and 44 are released, the rim 28 is secured about the blade roots 18 as disclosed in FIG. 2. The clamps 32 and 34 and rings 36 and 38 may be removed and the finished bladed wheel 10 is ready for use.

With this form of fabrication the blade roots need not be machined but may be formed to the rotor disc in their "as cast" condition. Further, there is no need for machining of the rotor disc rim to receive the blade roots.

If desired, a knockout slot may be formed by the use of one or more dummy blades having an enlarged smooth root with a generally wedge shape configuration. When the wheel is forged, the dummy can be easily removed and a lightweight plug inserted in its place. This plug is secured by means of a pin passed through the rim and the plug. Whenever it is desired to change a blade, the plug is removed and the blades 14 are slid circumferentially about the rim 28 in the slot 30 and removed radially through the knockout slot. Replacement of the blades involves an obvious reversing of the procedure.

The foregoing description constitutes the preferred form of the present invention. Obvious variations and applications of this invention will occur to those skilled in the art which will come within the scope and spirit of the following claim.

I claim:

The method of assembling a plurality of separate airfoil bladed members directly to a receptive rotor disc, comprising; forming said bladed members to include a root section having radially disposed side faces and a locking configuration provided on each axially disposed face thereof, clamping said bladed members together with root sections thereof in radial face engaging relation with next adjacent bladed members for providing an arcuate segment of bladed members with root sections forming a contiguous axial face, forming said rotor disc to include an annular groove having inwardly converging plane surfaced walls within the blade receptive periphery thereof and of sufficient width to readily receive the root sections of said bladed members therein, disposing a plurality of said clamped arcuate segments in a closed circular arrangement, moving the root sections of said arcuate segments radially into said groove, closing said groove about the root sections of said circularly arranged arcuate segments and simultaneous therewith reforming said plane walled groove into mating and locking engagement with the locking configuration provided on said root sections.

References Cited in the file of this patent

UNITED STATES PATENTS

| | | |
|---|---|---|
| 819,106 | Wilkinson | May 1, 1906 |
| 868,419 | Emmet | Oct. 15, 1907 |
| 2,392,281 | Allen | Jan. 1, 1946 |
| 2,454,480 | Thielemann | Nov. 23, 1948 |
| 2,475,772 | Allen et al. | July 12, 1949 |
| 2,654,143 | Hoesch et al. | Oct. 6, 1953 |
| 2,853,195 | Malcolm | Sept. 23, 1958 |

FOREIGN PATENTS

| | | |
|---|---|---|
| 590,579 | Great Britain | July 22, 1947 |
| 592,956 | Great Britain | Oct. 3, 1947 |
| 719,326 | Great Britain | Dec. 1, 1954 |